United States Patent [19]

Frederick

[11] 4,121,510
[45] Oct. 24, 1978

[54] COMBINATION COOKING RACK AND PAN

[75] Inventor: Louis J. Frederick, Louisville, Ky.

[73] Assignee: Frank R. Jarnot, Huntington, Conn.; a part interest

[21] Appl. No.: 769,467

[22] Filed: Feb. 17, 1977

[51] Int. Cl.² ............................................. A47J 37/01
[52] U.S. Cl. .................................. 99/425; 219/10.55 E
[58] Field of Search .......................... 99/425, 444–446; 229/2.5 R; 219/10.55 E; 426/234, 243; 220/70, 72

[56] References Cited

U.S. PATENT DOCUMENTS

| | | | |
|---|---|---|---|
| B 281,943 | 1/1975 | Kane | 426/234 |
| 1,301,197 | 4/1919 | Tully | 99/446 |
| 2,673,003 | 3/1954 | Stewart | 99/444 |
| 3,113,505 | 12/1963 | Keppler | 99/425 |
| 3,292,528 | 12/1966 | Myler | 99/446 |
| 3,485,434 | 12/1969 | Donovan | 229/2.5 |
| 3,640,209 | 2/1972 | Wilson | 99/446 |
| 3,854,023 | 12/1974 | Levinson | 219/10.55 E |
| 3,994,212 | 3/1975 | Wong | 99/444 |

Primary Examiner—Harvey C. Hornsby
Assistant Examiner—Timothy F. Simone
Attorney, Agent, or Firm—Clarence A. O'Brien; Harvey B. Jacobson

[57] ABSTRACT

A combination cooking rack and pan primarily for use with microwave ovens and the like which includes a molded or formed structure having a corrugated or sawtooth support platform with an extending rim surrounding all four sides of the support platform. Reinforcing ribs are also provided which are integral with the support platform and provide supporting members for the overall rack and pan device. Preferably, the entire rack and pan is formed of molded wood pump and/or related materials including the supporting rib members. The structure is designed to separate the food being cooked from the bottom of the device for the purpose of uniform heat circulation therearound and also to allow secretions from the food to drip and be separated therefrom. The device is relatively lightweight and the material of which it is made functions to absorb and retain food secretions therewithin. An external coating of a chemical compound may be applied or impregnated with the outside surface of the device to positively prevent leakage therethrough.

3 Claims, 8 Drawing Figures

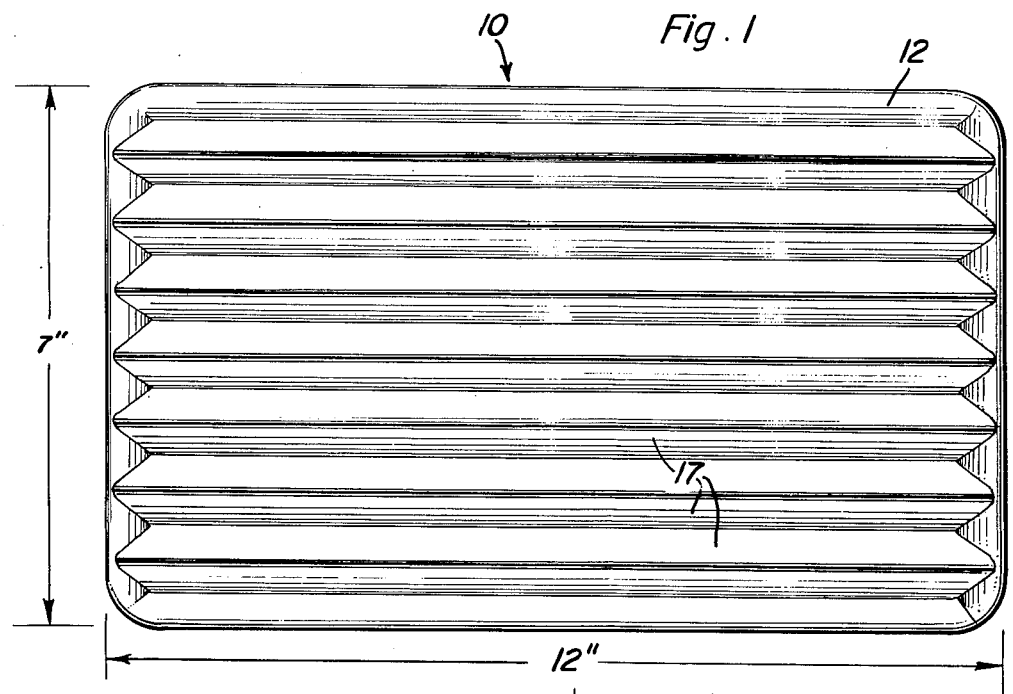
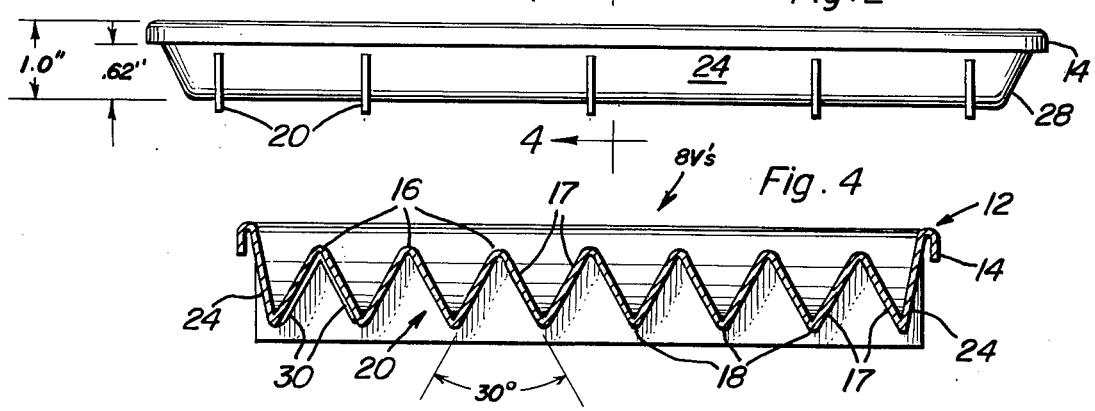
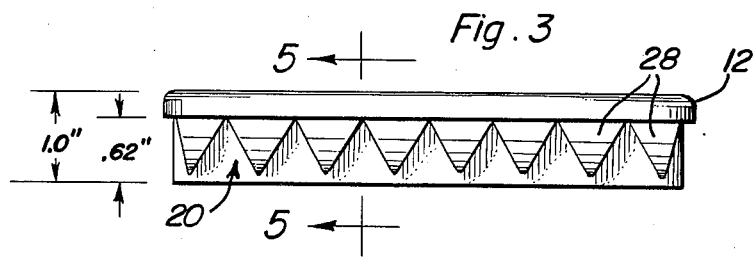
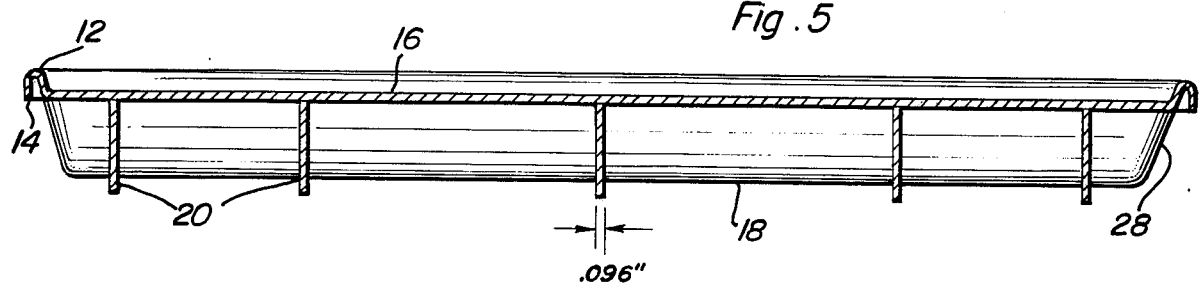

COMBINATION COOKING RACK AND PAN

BACKGROUND OF THE INVENTION

1. Field of the Invention

This invention relates generally to devices for use in cooking and especially to such devices which may be used for holding and supporting foods to be cooked by microwave cooking methods.

2. Description of the Prior Art

A common problem with known type receptacles for supporting and displaying food is that they are not adaptable for use as cooking utensils. That is, while they may perform perfectly well for supporting fresh meats or frozen foods in display counters and the like, they fail to provide the necessary strength and rigidity for use with the cooking of such foods.

Another problem with known type cooking receptacles is that they are often times made of metallic materials which positively should not be used with ovens of the microwave type. If such metallic type cooking receptacles are used with microwave type ovens, the results are often disastrous.

Another problem with known type devices of non-metallic material for the cooking of foods in microwave type ovens is that they generally are relatively expensive, and require cleaning after use thereof because they are too expensive to be thrown away.

A problem with devices which are made of non-metallic material and also made of relatively inexpensive material is that they lack the strength to properly support the foods to be cooked in microwave ovens thereupon, and especially fail in strength when exposed to the food secretions as emitted by the food stuffs while being cooked.

Known prior art patents which may be pertinent to this invention are as follows:

| | |
|---|---|
| 2,495,435 | 3,230,864 |
| 2,582,174 | 3,756,492 |
| 2,974,843 | 3,764,057 |

None of these known prior art devices offers the new and unique features of the invention disclosed herein.

SUMMARY OF THE INVENTION

An object of the present invention is to provide a combination cooking rack and pan device for use in cooking various types of food generally in ovens of the microwave type.

Another object of the present invention is to provide a cooking rack and pan structure which is formed and constructed of non-metallic material, which is relatively absorbent of food secretions and juices as generally emitted by food stuffs while being cooked, and the device tending to absorb and retain such secretions. An outer impregnation or coating of liquid resistant material also may be included with the device to prevent any leakage or mess therefrom when the receptacle is being used.

A further object of this invention is to provide a combination cooking rack and pan which is made of relatively inexpensive liquid absorbing material, and yet is designed and formed in such a manner that it has great structural strength and rigidity. Also, while having such desired strength, the overall structure is of very low cost and therefore may be completely disposed of after a one-time use thereof which eliminates the bother and expense of handling, cleaning, storage, etc.

Another still further object of this invention is to provide a cooking receptacle having a support platform therewith which is of substantially corrugated configuration for greatly increasing the strength and rigidity of the receptacle. Transversely arranged supporting rib members also are provided to increase the overall strength of the receptacle as well as forming strong supporting members for said receptacle.

The combination cooking rack and pan device of this invention has a number of very important new and unique features. The device is a molded or formed cooking rack and receptacle of relatively low cost and of completely non-metallic construction. Preferably, the composition of this cooking receptacle is similar to paper, pulverized wood, and related molded products. It may be used as an entirely self-contained receptacle or as an insert for use with other receptacles such as roasting pans or plates. The receptacle device of this invention is designed to act as a support platform for separating the food being cooked from the bottom or cooking surface of the oven, so that a more uniform heat radiation and heat circulation around the food is effected. Also, the special corrugated configuration of the main platform of this receptacle is such that all seepage of juices and other secretions from the food being cooked goes to the lowermost points of said device and is completely separated from the food during the cooking process.

This receptacle device is primary designed for use in conjunction with microwave ovens, and other similar devices which utilize microwaves for the cooking and preparation of food. While this receptacle is somewhat similar in appearance to fabricated containers as sometimes used in the packaging of meat for the purpose of displaying same, it has a number of important features and distinctions thereover. The construction and design of this novel device features a corrugated or V-shaped structure which functions as a platform for supporting the foods to be cooked thereupon. Supporting ribs run transversely to the platform V's and substantially strengthen the overall device. This device will remain rigid and stable under varying weight conditions for any type of food desired to be cooked and processed thereupon. The device is preferably fabricated from economical material similar to paper or pulverized wood so that the entire device may be disposed of in its entirety after its intended use, thereby eliminating normally required cleaning or maintenance. It also permits a much more hygienic method of food preparation since the original devices may be stored or contained within clean, relatively sterile packages until time for use in the actual cooking of the food.

The V or corrugated shape platform structure of this invention allows food secretions to seep and slide readily into the lower portions of said device without obstruction and without restrictions. The fiber composition of this device allows ready absorption of food secretions during the cooking process, similar to a wick or blotter, thereby limiting and lessening the residue of the secretions, such as fats, which normally collect and are contained within conventional type cooking receptacles. Furthermore, a preferred construction of this device involves chemically impregnating or chemically coating of the outside of the device to completed block and prevent any transfer of liquids therethrough.

The overall device is very stable, very strong, and especially in larger models of same for use with substantial food weight, its construction is very advantageous.

Another feature of the device is while it is more hygienic by being completely disposal, also by being made of materials involving wood pulp or the like, the device is bi-degradable which will permit same to be disposed in many different manners and without being a problem of contamination to the environment.

The device is disclosed in two forms with both embodiments involving a support platform with corrugated or V-shaped configuration thereto, and with transversely formed support ribs integrally mounted perpendicular to the V's of said support platform. This V-shaped support platform permits a good circulation of heat around the underside of the food being cooked on the top edges of said V's and thus greatly aids the overall cooking process.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a plan view of one embodiment of the invention.

FIG. 2 is a side elevational view of the embodiment of FIG. 1.

FIG. 3 is an end elevational view of said embodiment.

FIG. 4 is an end elevational view, partly in cross section, taken generally along line 4—4 of FIG. 2.

FIG. 5 is a side elevational view, partly in cross section, taken generally along line 5—5 of FIG. 3.

DESCRIPTION OF THE PREFERRED EMBODIMENT

Figure 6:
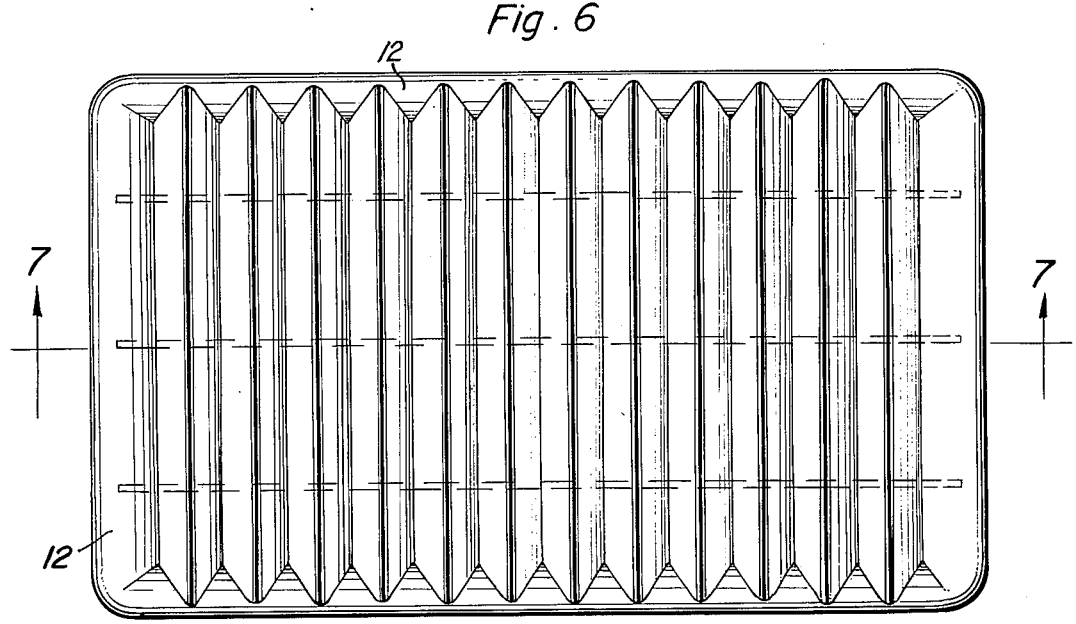
FIG. 6 is a plan view of another embodiment of the invention.

Referring to FIG. 1 of the drawings, reference numeral 10 indicates in general the combination cooking rack and pan of this invention. Looking at FIGS. 1-5, the first embodiment of the invention will now be described in detail. The pan or tray type receptacle comprises a panel-like body provided with a rim 12 extending around the upper peripheral portion thereof with a depending downwardly extending flange portion 14 completely therearound. The side walls are formed by panels 24 and connecting integrally with said side panels is a plurality of V-shaped panel members, or corrugations as it were, having upper support edges 16 and lower connecting edges 18. These panel members 17 are provided for the entire width of the receptacle. Each pair of panel members 17 making a single V are enclosed at the respective ends thereof with end panels 28.

In order to substantially strengthen and increase the rigidity of the overall structure supporting rib members 20 are provided under the V panel members 17 at a number of spaced points therebeneath. As best seen in the views of FIGS. 2 and 5, five of these spaced supporting rib members 20 have been provided. This is for a rack of average dimensions of approximately 12 inches in length, approximately 7 inches in width, and with the five supporting ribs each being of approximately 0.096 inch in thickness. Also, with such a size receptacle, it has been found that a height overall of approximately 1 inch and with a spacing from the bottom of the V edges 18 to the top of V edges 17 approximately 0.62 inch is highly satisfactory. Also, the panels 17 preferably make a V angle of approximately 30° relative to each other as best seen in the view of FIG. 4.

Preferably, the overall structure is formed or molded of pulp fiber, or wood sawdust-type material to form an overall and very lightweight liquid absorbing structure. This formed or molded configuration with the V-shaped support platform over substantially the center of the receptacle together with the rolled circumferential edges 12, 14, and the transversely formed support rim members 20 form a very strong rigid structure. Preferably, a liquid impervious coating is applied as indicated by reference numeral 30 in FIG. 4 to all of the outside surfaces of the V-panels 17, the side walls 24, and the end walls 28. FIG. 4 only shows several of the panels being coated, but in actual practice, all of the ones mentioned would be appropriately coated. This is for the purpose of preventing any of the juices or other liquids emitted and discharged from the foods being cooked from passing through the fibrous pulp material from which the structure is constructed. While a coating 30 has been indicated, an impregnation process may also be used instead of the coating process. However, in actual practice, the coating process has been found to be superior and less costly than an impregnation one and is the preferred method.

Figure 7:
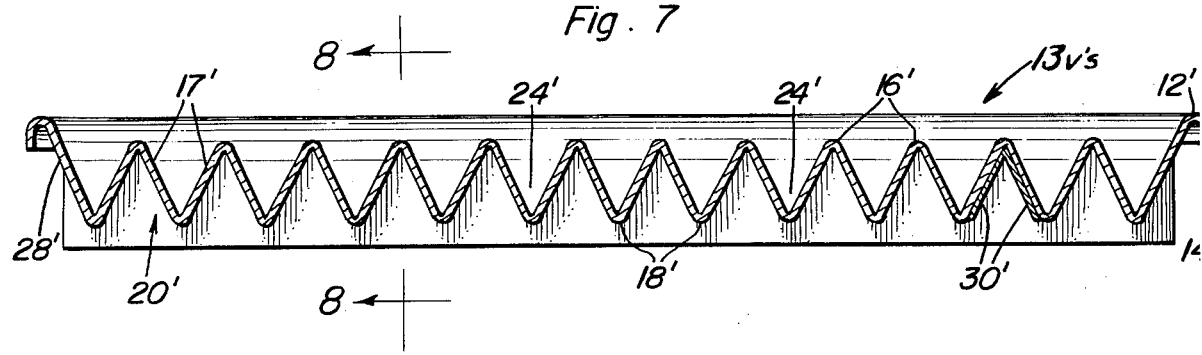
FIG. 7 is a side elevational view, partly in cross section, taken generally along line 7—7 of FIG. 6.
Figure 8:
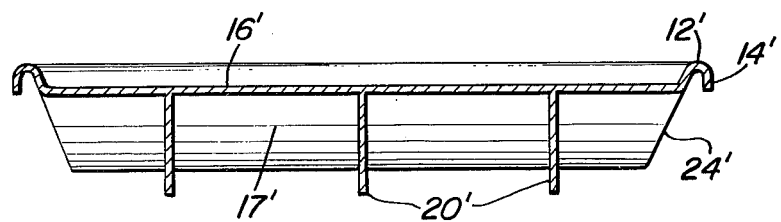
FIG. 8 is an end elevational view, partly in cross section, taken generally along line 8—8 of FIG. 7.

While the embodiments shown in FIGS. 1-5 have the V panels forming the primary support platform of the device running longitudinally the length of the structure, another embodiment is also contemplated. This embodiment is shown in FIGS. 6-8 of the drawings. This embodiment is basically the same as that of the first embodiment, but with the primary support platform having the V panels arranged in alignment with the width of the pan rather than longitudinally thereof. Similar reference numerals have been used with this embodiment as were used with the first embodiment, but with a prime added thereafter. In this embodiment, the support rib members 20' run longitudinally of the structure rather than across the width thereof, and for a pan of dimensions similar to those of the first embodiment, i.e 7 inches wide by 12 inches long, only three of such support ribs 20' are necessary to perform the same function as the five ribs 20 provided in said first embodiment. However, in the second embodiment, 13 V's make up the primary support platform structure as compared to only 8 V's for the first embodiment. A coating 30' is also indicated on several of the panel members of this embodiment, but a greater amount of same is required for this version of the device as compared to the first version thereof, since the greater number of V's, i.e. 13 as compared to 8, substantially increases the surface area which must be coated or impregnated. The same overall dimensions for the second embodiment as those set forth and shown for the first one have been found to be quite satisfactory.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A one piece, low cost and disposable non-metallic combination food support tray and cooking pan assembly for use in cooking food within a microwave oven, said assembly including a panel-like body including two pairs of interconnected opposite side and upwardly extending integral side walls extending peripherally thereabout, the upper marginal portions of said side walls terminating in reversely outwardly and downwardly directed integral reinforcing flange portions extending about said assembly, said body defining a plurality of side-by-side imperforate integral parallel V-shaped panel members extending between one pair of said opposite side walls and spaced between the other pair of opposite side walls with one pair of side walls closing the corresponding ends of said V-shaped panel members, said panel members, side walls and reinforcing flange portions being constructed of molded fiber pulp fluid absorptive material, said assembly further including, spaced between said one pair of side walls, parallel integral reinforcing and support ribs integral with said V-shaped panel members, extending between said other pair of side walls and depending downwardly from and below said V-shaped members, said ribs being longitudinally continuous between their opposite ends with the lower marginal edge portions of said ribs projecting slightly below the lowermost portions of said V-shaped members, the outer surfaces, only, of said V-shaped members and said pairs of opposite side walls including a fluid impervious coating, said ribs providing reinforcing for said assembly extending transverse to said V-shaped members and the latter providing reinforcing for said assembly extending transverse to said ribs.

2. The combination of claim 1 wherein said assembly is rectangular in plan shape and said V-shaped members and ribs extend longitudinally and transversely, respectively, of said assembly.

3. The combination of claim 1 wherein said assembly is rectangular in plan shape and said ribs and V-shaped members extend longitudinally and transversely, respectively, of said assembly.

* * * * *